United States Patent [19]

Bonnemoy

[11] Patent Number: 4,866,259
[45] Date of Patent: Sep. 12, 1989

[54] EQUIPMENT FOR AUTOMATIC PERSONALIZING OF CREDIT CARDS

[76] Inventor: Marc A. Bonnemoy, 4, Ruelle aux Moines, 95450 Vigny, France

[21] Appl. No.: 83,117

[22] Filed: Aug. 10, 1987

[30] Foreign Application Priority Data

Aug. 8, 1986 [FR] France ................ 86 11547

[51] Int. Cl.⁴ .......................................... G06K 13/00
[52] U.S. Cl. ................................. 235/475; 235/441; 235/449; 235/480; 360/2; 902/29
[58] Field of Search .............. 235/441, 475, 486, 449, 235/475, 486; 360/2; 369/178, 180; 902/29

[56] References Cited

U.S. PATENT DOCUMENTS

| | | | |
|---|---|---|---|
| 3,735,095 | 5/1973 | Mutz et al. | 235/480 |
| 4,597,495 | 7/1986 | Knosby | 209/3.3 |
| 4,745,265 | 5/1988 | Douno et al. | 360/2 X |

FOREIGN PATENT DOCUMENTS

| | | |
|---|---|---|
| 0088591 | 9/1983 | European Pat. Off. . |
| 2563985 | 11/1985 | France . |
| WO86/04170 | 7/1986 | France . |
| 2091638 | 8/1982 | United Kingdom . |

Primary Examiner—David L. Trafton
Attorney, Agent, or Firm—Armstrong, Nikaido, Marmelstein, Kubovcik & Murray

[57] ABSTRACT

The invention relates to a card-personalizing apparatus comprising at least one device for treating the cards and one handling robot. The treating device comprises a plurality of personalizing units associated with a control unit. The handling robot includes a feeding hopper (1), a stacking hopper (6), a scrapping hopper (7) and gripper device for gripping the cards (3) mounted on a 2-way shift device (4), a control logic (L) being connected to the control unit to manage the personalizing operations.

24 Claims, 13 Drawing Sheets

| Sub-Assemblies | Actuators | Sensors | Functions |
|---|---|---|---|
| Station 1<br>starting<br>cassette | | | Cassette empty<br>Tongs closed |
| Station 2<br>Tongs control<br>Card (Y axis)<br>Card transfer<br>(Y axis) | | | Tongs open<br>Tongs closed<br>Shift safety<br>Tongs withdrawn<br>Shift safety, tongs in forward position<br>Tongs withdrawn<br>Tongs in working position<br>Safety in card-pickup position<br>Safety in defective-card unloading position<br>Safety in good-card unloading position<br>Safety at rest (opposite starting cassette)<br>End-of-travel safety (opposite valid-card cassette)<br>Cells: stop position at working station:<br>At rest: slow down the motor<br>At center: motor shut-off<br>Working: slow down the motor |

| | | | |
|---|---|---|---|
| Station 3 defective-card receptable | | | card present at input full receptable |
| Station 4 valid cards inserted in cassette | shut-off | | card present at input cassette being replaced |
| Station 5 Reader No. 1 | | | reader result card present in reader |
| Station 7 Reader No. 2 | | | reader result card present in reader |
| Station 8 Reader No. 3 | | | reader result card present in reader |
| Station 9 Reader No. 4 | | | reader result card present in reader |
| Station 9 Reader No. 5 | | | reader result card present in reader |

FIG. 10b

EQUIPMENT FOR AUTOMATIC PERSONALIZING OF CREDIT CARDS

FIELD OF THE INVENTION

The invention relates to equipment for automatic personalizing of cards, particularly microcircuit ones like bank cards. Developments with cash-less transactions have favored the growth of credit cards issued by banks, credit institutions or other such financial establishments.

BACKGROUND OF THE INVENTION

Credit cards, serving for payment without handling any cash; or, for instance, for automatic withdrawal of paper money, contain data coded on magnetic tracks peculiar to these cards. Generally the information concerns the party issuing the card and the actual card holder (name, card number, the secret-code determining base, ... ). Some items of data are inscribed in raised characters on the card (card-holder name and number) so that they can be easily reproduced on carboned slips after the card is put in suitable equipment for the purpose. Then we speak of "embossed" or, better yet, of "stamped" cards.

More recently we have noted the appearance of micro-circuits ("fleas") on such magnetic-track cards. Hence, those of this type come as combination cards in that they have, at one and the same time, an electronic memory and at least one magnetic track (Track IS02). These two media, then, the microprocessor and magnetic track, are meant to receive the same data, and including the electronic medium is explained by reasons of security in use (inviolability). However, though personalizing of the card by its magnetic track is a high-speed matter (less than a second), the micro-circuit operation takes at least several tens of seconds (30-to-40 seconds).

There are two ways to make dual-purpose cards. With one way, the embossed and magnetically-coded cards are inserted in magnetic reader-encoders which, using data provided by the magnetic track, encode the microcircuits with the same information. The SYSCAM markets this type of equipment under the SYSCAM 90 label. This bank-card, memory-type personalizing device utilized commercial reader-encoders and a microcomputer, of a type compatible with the IBM-PC, which can run the personalizing operations of several readers. Reading of the bank-card IS02 magnetic track induces a search for cardholder data on the SYSCAM microcomputer disks. Then the latter are encoded on the microcircuit by way of the "flea" encoder. This apparatus does the personalizing operation rather slowly (in about 30-to-40 seconds) which, for that matter, is consistent with manually inserting cards in reader-encoders. Just the same, now it is desirable to accelerate the rate at which these cards are produced in order to get reasonable production costs. Each of these reader-encoders could be linked with a robot to feed to the latter, cards to be personalized at the end of each personalizing operation. However, that arrangement would not be economically feasible, and anyhow it would not solve the slowness problems associated with the personalizing process.

A second type of production, found especially in the U.S.A., amounts to making use of personalizing devices which accomplish all the personalizing operations simultaneously: embossing, encoding of the magnetic track and microcircuit encoding.

This invention seeks to offset the problems that result from slow functioning of the personalizing process for combination cards by optimizing the time-wise distribution of the tasks required for personalizing. Such an approach makes it possible to considerably improve the rate at which these cards are produced, thus cutting down on production costs. Another purpose of the invention is to provide a dual-purpose personalizing operation at moderate cost and one that is easy to install.

SUMMARY OF THE INVENTION

The proposed personalizing device is of the type including at least one treatment device such as a reader-encoder and robot. In its most general definition the treating device comprises several personalized units, each of them associated with a control unit suitable to management of the personalizing operations, whereas the handling robot includes:
- a feed hopper suited to accommodating the cards to be personalized,
- a stacking hopper suitable for gathering those cards correctly personalized,
- a scrapping hopper suitable for accommodating cards incorrectly personalized or defective ones,
- a gripping device for gripping the cards, mounted on a two-way shifting device for the gripping device, suited to:
  extracting a card from the feed hopper,
  transferring the card to a personalizing unit,
  inserting it in the unit,
  recovering it from the unit,
  transferring it to the stacking hopper or to the scrapping hopper if it is defective,
  discharging it into the stacking hopper, or else the scrapping hopper if it is defective,
- a control logic, connected to the control unit to manage the personalizing operations, suited to actuating the gripping device and the shift device so as to insert, in the course of a personaling operation in a personalizing unit, one or more operations of extracting, transferring or unloading a card with respect to one or more other personalizing-operation units.

It would be of advantage to also have the robot include:
- a card-separating device linked to the feed hopper and suitable for partially extracting a card from the hopper,
- card-storing devices which are connected to the stacking hopper and the scrapping hopper, respectively, and suitable for storing a card in one of the hoppers.

The invention is particularly intended for cards that have one or more coded magnetic tracks and a non-coded microcircuit, and the personalizing operation consists of coding the microcircuit with the help of data right on the card and/or information stored in the controlling unit. The personalizing units, then, are combination reader-encoders, with a magnetic track and a microcircuit, that include a card-to-memory connector. A variant consists of personalizing the microcircuit with data stamped (or embossed) on a card which may not have any magnetic track. It is even conceivable that the personalizing units themselves are, or include, embossing devices, marking devices or even magnetic encoders. In the case of one aspect of the invention, the feeding and stacking hoppers are in the form of interchangeable and removable cassettes. Advantageously at least one sensor is linked to the feed hopper in order to detect whether it is empty, whereas at least one status switch is connected to the scrapping hopper in order to find out whether it is full.

According to another aspect of the invention, the card separating or storing devices comprise at least one motor, preferably of the reduction type, as well as a rubber belt, preferably one with a silicone coating. To greater advantage yet, the separating device includes at least a sensor to determine whether a card has left the feed hopper, motor control over the separating device being maintained so long as the card has not been detected by the sensor in question. The sensor then transmits to the control logic a faulty-separation signal if the card to be extracted is not detected by the sensor by the end of the time normally anticipated for the extraction operation, and this signal can also be interpreted by the control logic as indicative of an empty hopper if the control logic simultaneously receives a signal from the sensor linked to the feed hopper.

Similarly, each storing device includes at least one sensor to detect whether there is a card present at the input of the stacking hopper (the scrapping hopper, respectively), and motor control over each storing device is maintained so long as the card is detected by the sensor in question.

As will be seen later on, the card-gripping device comprise tongs that are preferably controlled by a reduction-type motor associated with an eccentric. More particularly, associated with the tongs are at least two status switches that control the tongs' open and closed positions, respectively. This gives us the advantage of having two options to absorb positioning errors at the feeders, made possible by the action of a spring and flexible washers located in the tong mechanism.

In accordance with another aspect of the invention, the device comprises:
- a motor, preferably a DC one, allowing for movement of the gripping device along an initial axis corresponding to the stop positions of the device in front of a hopper or personalizing unit,
- a motor, preferably of the reduction type, to permit movement of the gripping device along a second axis corresponding to transfer of a card between the gripping device and a personalizing unit or a hopper. More exactly put, the shift device is provided with one cell to permit locating a personalizing unit or hopper or selected hopper along the first axis of movement. It is preferable that there be associated with the cell at least two other cells situated on either side of the aforementioned cell, to allow for slowing down the shift device as it approaches the personalizing unit or the selected hopper. More particularly, a shift device includes at least two safety switches for detecting an overrun along the first axis, put at the initial position and at the final position, respectively, of the device along this axis. Similarly, the shift device is provided with at least two safety switches to detect a travel stop along the second axis, put at the withdrawal position and forward position, respectively, of the tongs along the axis.

Finally, it is a great advantage to have associated with the shift device at least one sensor to determine the withdrawal position of the gripping device along the second axis, whereas the gripping device are provided with another sensor which, hidden by a flag located at the input of each personalizing unit, indicates the forward position of the gripping device in front of the personalizing units. Similary, linked to the shift device there is at least one switch, placed at the input of each hopper, which allows for positioning of the tongs in front of the corresponding hopper.

In a preferred way of realizing the invention, each of the personalizing units includes a guiding assembly suitable to provide for proper insertion of a card in the unit and compensation for positioning discrepancies. It is of advantage to have each personalizing unit include a contact to indicate insertion and proper positioning of a card in the unit and transmitting a signal to the control unit of the personalizing units that initiate the personalizing operation.

The control unit of the personalizing units is programmed preferably in such a way as to transmit a series of signals to the control logic to indicate:
- the availability status of the personalizing units,
- the completion status of the personalizing operation in progress within the personalizing units in operation,
- the personalizing end-of-operation status of the card being treated in the personalizing unit,
- the result of the personalizing operation for the card.

BRIEF DESCRIPTION OF THE DRAWINGS

Other features and advantages of the invention will become apparent on examining of the detailed description below and the attached drawings, in which:

FIGS. 10a and 10b are a chart of the signals transmitted or received by each station of the personalizing operation;

DESCRIPTION OF THE PREFERRED EMBODIMENTS

Figure 1:
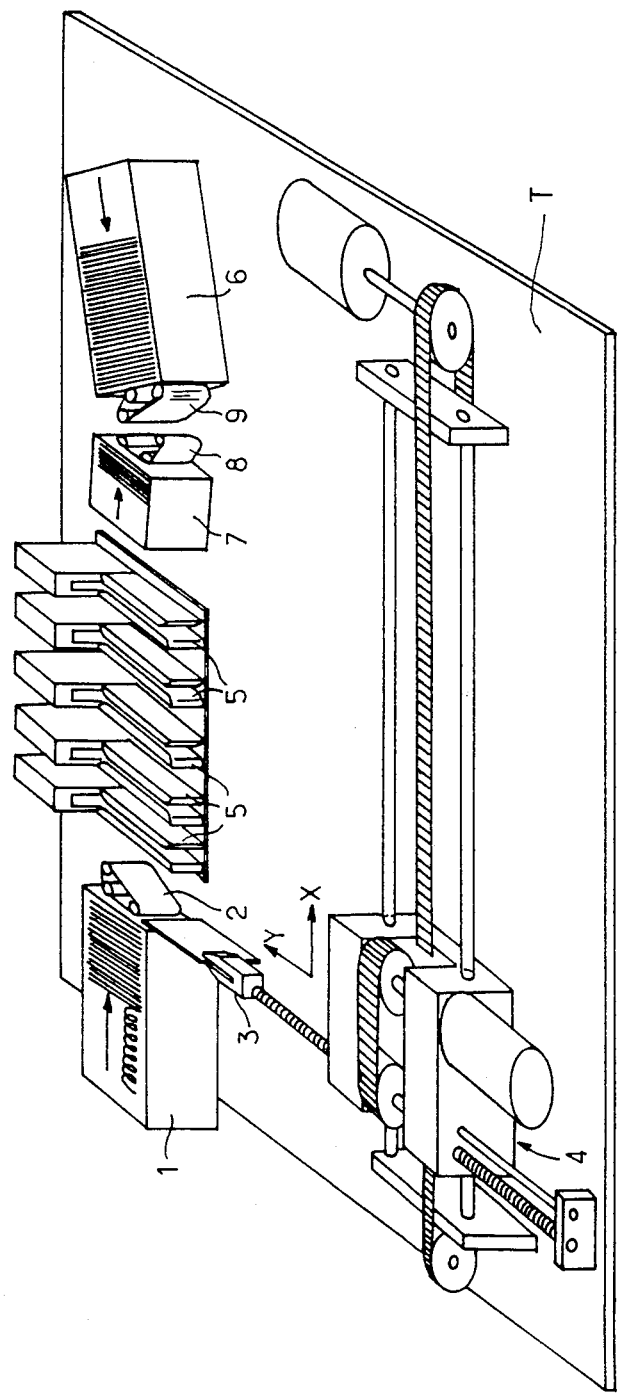
FIG. 1 is a basic diagram of the personalizing apparatus as a bird's-eye view in accordance with the invention.
Figure 2:
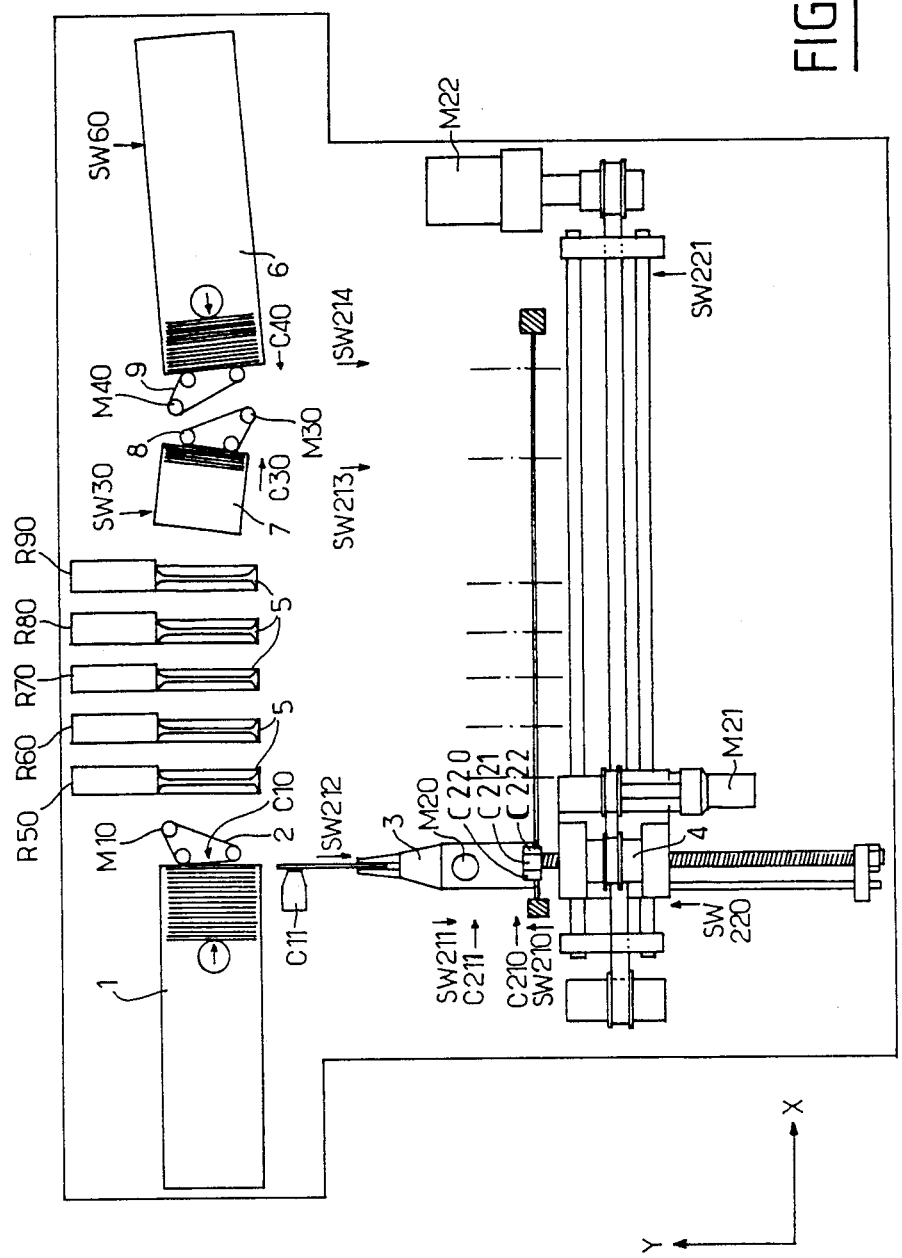
FIG. 2 is a basic diagram of the same apparatus as seen from above.

In FIGS. 1 and 2 the personalizing apparatus has been represented in its entirety. This consists of a table suitable for supporting the various sub-assemblies of the operation. Diagrammatically the apparatus involves a feed hopper 1 which contains the cards to be personalized, a card-separating device 2 (also called a "depiler"), gripping means 3 which may be tongs, for example, a two-way shift device 4, a composite grouping of 5 reader-encoders, a scrapping hopper to gather the defective cards 7, which is, itself, provided with a card-storing device 8 (also called a "piler"), and a stacking hopper 6 to accommodate the personalized cards, which is also provided with a card-storing device 9.

In the preferred manner of realizing the invention, the hoppers and reader-encoders are located mostly along a common axis; however, the shift device is put on an X-axis parallel to the hopper and reader-encoder axis. The tongs, perpendicular to the shift device, move along a Y-axis which is perpendicular to the X-axis, and they face the hoppers and reader-encoders. The table can be covered over by a protective hood which is not represented. The overall dimensions are typically these: $1100 \times 800 \times 300$ mm. The robot unit is fixed to a sturdy plate.

In FIG. 2 there have also been indicated the optical sensors that are represented by the letter C, the switches represented by the letters SW, suited to transmitting signals to a control logic that manages all the robot operations. Also noted are contacts R which, themselves, transmit signals to the reader-encoder control unit. The functions of these sensors, these switches and these contacts will be detailed in the description of the figures relating to each component of the apparatus.

In its most general functioning, a card to be personalized and contained in the feed hopper 1 is "depiled" with the help of the separating device 2 actuated by a motor M10. The tongs 3, controlled by the motor M20, then seize the card and transfer it in making a two-way shift toward the reader-encoders 5, where the tongs deposit it. These tongs 3 are moved, by the shift device 4, along the two horizontal axes, X and Y, which are mutually perpendicular. The shift device is actuated by two motors M21 and M22. At the close of the personalizing operation, the tongs 3 grasp the personalized card again (or, possibly, the defective one) and unload it into one of the appropriate output hoppers, the stacking hopper 6 or scrapping hopper 7 for defective cards. "Piler" devices 8 and 9 (actuated by motors M30 and M40, respectively) ensure insertion of the card.

Figure 3:
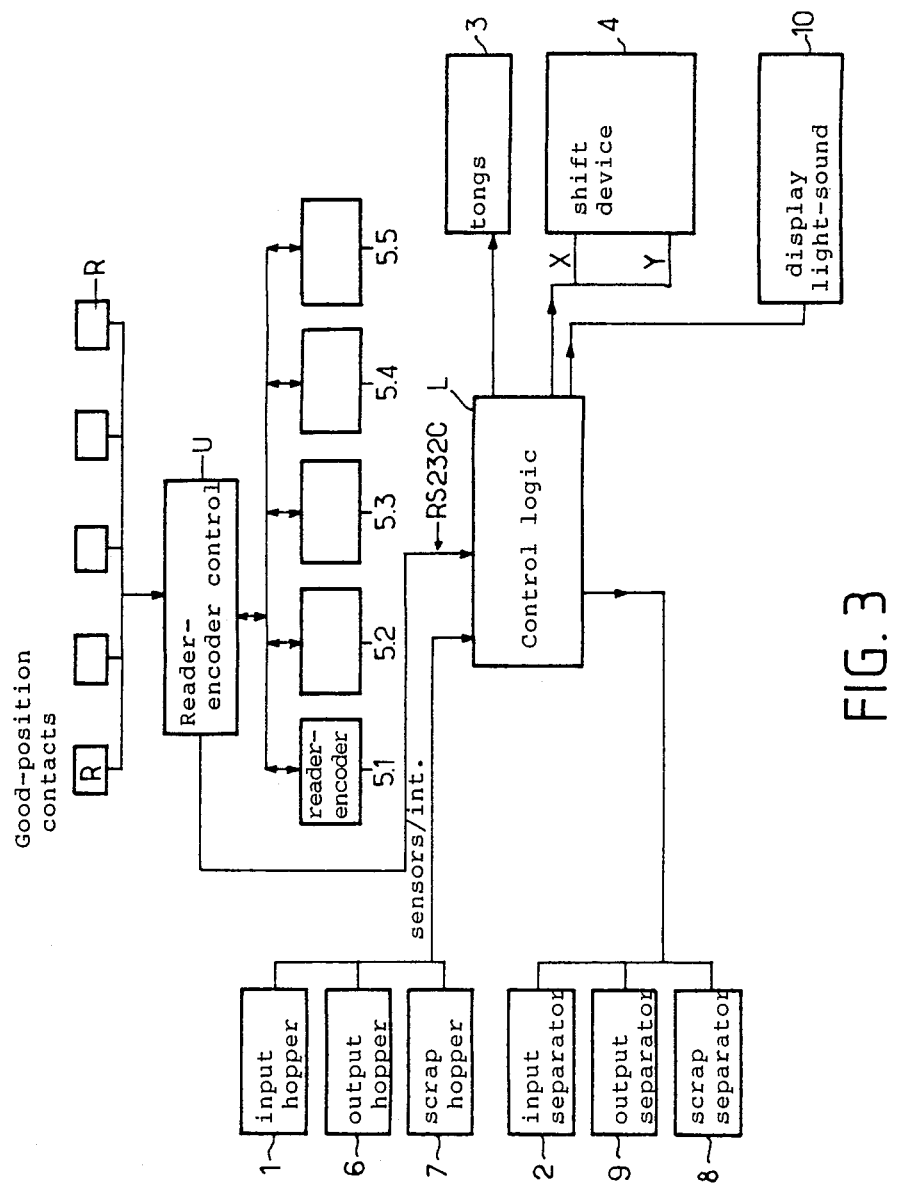
FIG. 3 is a functional diagram of the same apparatus and illustrating the relationships between the various portions of the apparatus and the control logic.

FIG. 3 illustrates more particularly how the various components of the personalizing apparatus, under the invention, are electrically connected among them. A control logic L centralizes management of the various operations of the robot. First of all, it receives, as input, the information coming from hoppers 1, 6, 7 (state of hopper), as well as from the separating devices linked to each hopper 2, 9, 8. These data are provided by sensors or switches indicated in FIG. 2 by the letters C and SW, respectively. Photo-electronic make-and-break switches are provided in the input lines so as to ensure galvanic isolation. The control unit also receives the data coming from the reader-encoder control unit U. This manages the personalizing operations proper for the readers-encoders 5—1, . . . 5—5. Contacts R constitute the mechanical interface between the robot and this control unit U.

In the preferred manner of realizing the invention, the controller logic L is a microprocessor of the INTEL family, of the type 8088. It manages just those operations that relate to actuating the robot. As for the reader control unit, this is typically an IBM-PC microcomputer (or one compatible with the latter). Communication between the control logic L and the reader control unit U occurs, as represented in the figure, via a RS232C connection. Moreover, two types of logic data issuing from the readers are communicated to the control logic (card on hand, personalizing operation finished). The details of these data will be explained later on. The RS232C connection can also serve for remote loading of the robot software.

The control logic L is provided either with read-only storage, programmable and erasable REPROM in case the robot management program in question is "frozen" or "jam" of the mechanism, or else with a live RAM memory in the event of remote loading. A capacity of 8 kilobytes has proved to be sufficient. Moreover, the control logic L involves output lines to transmit interruption or control signals to the actuating motors M, and possibly a luminous, or sound, display device for alarm messages. This is particularly the case for motor M20 (opening and closing of the tongs 3), the motors M21 and M22 (shift device 4 along axes X or Y). Relays (the case with the controls for the M21 and M22 motors) or power transistors (other instances) serve as interfaces for these output lines. The input and output cards can be modular and separate.

Figure 4:
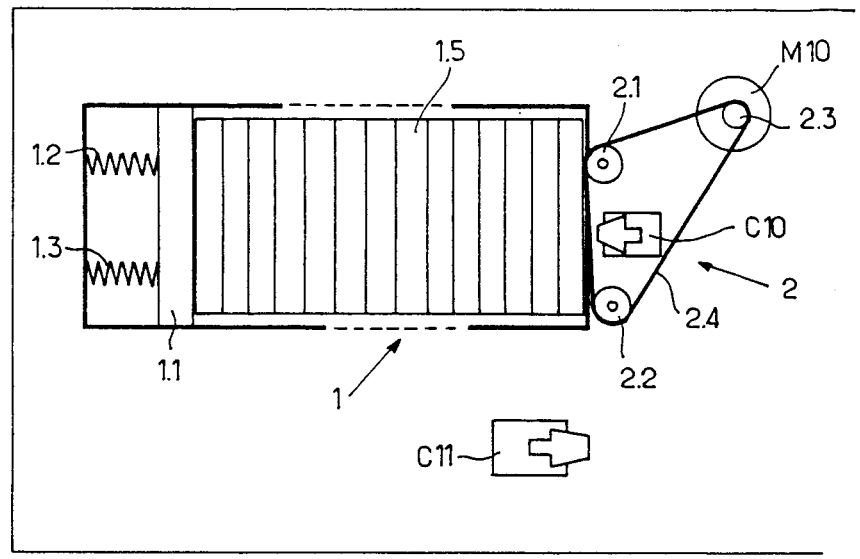
FIG. 4 is a detailed diagram of the feed hopper and the separation device associated with it.

Now reference is made to FIG. 4 which describes in detail the feed hopper 1 in FIGS. 1 and 2, as well as the separating device 2 ("depiler"). The feed hopper appears in the shape of a removable cassette which can contain, for instance, as many as 200 cards. Having first been embossed, the cards are of standard dimensions: $86 \times 54$ mm (ISO 3554). In the preferred way of realizing the invention, these are combination cards which have at one-and-the-same time, a magnetic track of the IS02 type and a microcircuit. Piled one on top of the other, they are all turned the same way with the microcircuit on the outside with respect to the shift device. Once embossed, they have a maximum thickness of 1.3 mm. The cassette, where about 200 cards can be lodged vertically, is of typical dimensions: $90 \times 90 \times 300$ mm.

A plate 1.1, provided with springs 1.2 and 1.3, exerts pressure on the pile of cards 1.5 and keeps them vertical. This vertical arrangement has been determined preferable to the horizontal one; as a matter of fact, with the latter, the embossed cards laid flat would slide toward the thinner side. The uniform pressure exerted by the plate 1.1 on the vertical cards offsets this inconvenience. A C10 cell, of a reflecting-sensor type, allows for indicating whether the hopper is empty, and typically use is made of a model-OPB 703A cell.

In this same FIG. 4 the separating device in FIGS. 1 and 2 has been represented. It involves two pulleys 2.1 and 2.2, as well as a reduction-type motor M10 provided with a rotating shaft. A rubber belt 2.4, which has a silicone coating, is stretched over the two pulleys 2.1 and 2.2, as well as a roller 2.3 mounted on the rotating shaft. The separating device or "depiler" is put at the end of the feed hopper 1 opposite the latter. The pulleys 2.1 and 2.2 are so positioned that the belt 2.4 is placed against the card to be extracted from hopper 1. A cell C11, of the same type as C10, is located in the extension of the hopper width in the direction the card is extracted. This cell C11 controls the reduction-type motor M10. So long as the card to be extracted does not hide this cell C10, the actuating control of the motor M10 is maintained. The cell C10 is positioned in such a way that the card sticks out about 50 mm from the hopper 1.

When the cell C10 detects that the card has been extracted, the actuating control of the motor M10 is stopped. This is triggered once again when the tongs 3 grasp the extracted card. The idler mounted on the M10 drive shaft actually allows the tongs to grasp the card easily. The motor M10 is then started again, which causes rotation of the belt 2.4 and extraction of a new card.

The extracting operation lasts about 2.5 seconds. The control logic L, which governs all operations of the robot, is programmed in such a way that if, after a certain length of time, say 3 seconds, the cell C11 is not sent a signal indicating that a card has been detected, a light (or sound) alarm is turned on. The control logic L then checks to see whether it has already recorded a signal coming from the cell C10 to show an empty feed hopper. Accordingly, two alarm signals are, then, to be considered: the first one (luminous or sound, or possibly a display on a video terminal) indicates an irregularity in the separating device 2; the second one, different from the first (for example, luminous and sound or possibly a display on a video terminal), signals an empty feed hopper. The absence of cards obviously means that the cell C11 cannot detect any card, without the depiler, itself, having any operational defect.

Figure 5A:
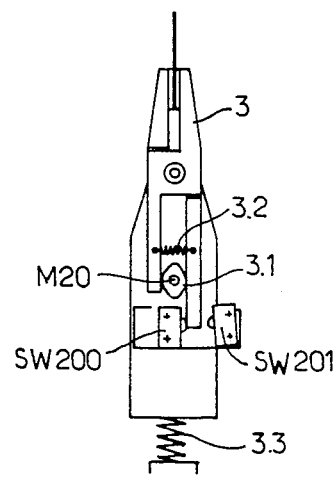
FIG. 5a is a detailed diagram of the tongs.

FIG. 5a represents the gripping means 3. In one way of realizing the invention the latter are in the form of tongs 3 with flat, movable ends (and) which can properly seize an embossed card.

So as not to damage the microcircuit, the cards are piled in the feed hopper in such a way that the microcircuit, generally located in an upper corner of the card, is situated by the outer side of the tongs and shift-unit component. On the other hand, the tongs 3 grasp the card in such a manner that the card is held firmly. Just the same, it is desirable to make whatever adjustments are necessary for the tongs to be able to lodge the card properly in the personalizing units. Enough room should be provided so the tongs can move above the reader-encoders. The tongs 3 are controlled by a reduction-motor M20. It is preferable to have a motor linked to an eccentric which allows for greater precision of movement. By way of a cam 3.1, this motor transmits movement to the flat ends of the tongs in just one direction of rotation. The tong arms are pressed against the eccentric by a spring 3.2. Microswitches SW200 and SW201, located inside the tongs, actuate opening and closing of the tongs and permit, at any time, transmitting tongs-open and tongs-closed signals to the control logic. These switches are miniaturized and are in the form of micro-contacts. Typically these are QS microswitches of the AH 3206 type. The M20 motor is directly controled by the control logic L. The tongs 3 have 2 options. The first, along the Y-axis, corresponds to advancing (or withdrawing, respectively) of the tongs toward a hopper or a reader (or from a hopper or reader, respectively). This is possible on account of a spring 3.3 located along the axis on which the tongs are mounted. The other option, along the X-axis, makes it possible for the tongs to absorb positioning errors at the readers. This is made possible by the action of two flexible washers which are not represented.

Figure 5B:
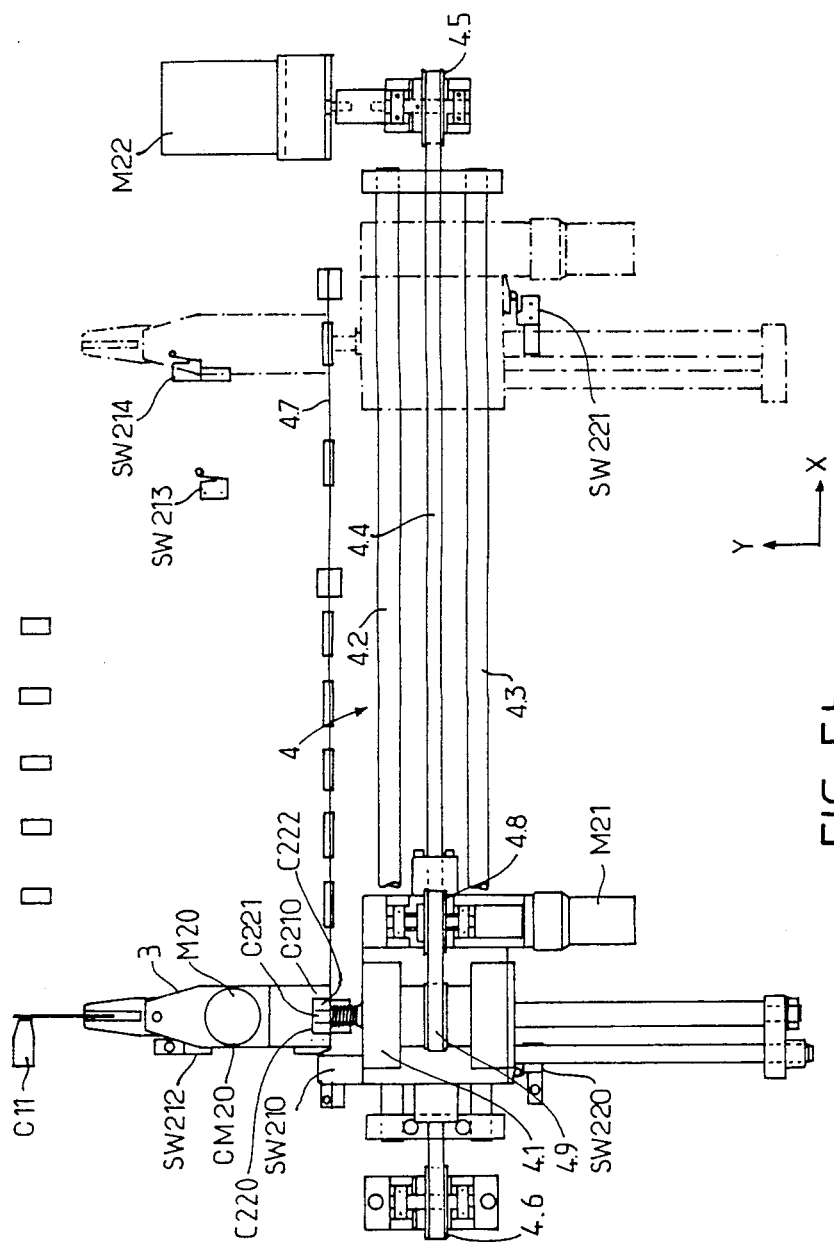
FIG. 5b is a detailed diagram of the shift device and the tongs mounted thereon.

FIG. 5b illustrates the shift device, as well as the tongs described above, bearing reference 3, which are on a truck-mounted worm 4.1, itself fixed to a shift device 4. Two axes of movement in the horizontal plane, for table T, which are mutually perpendicular (axes X and Y), are possible.

The first of these (axis X), corresponds to the stop positions of the truck in front of one of the personalizing-apparatus stations, namely a hopper 1 (feed 1, scrap 7, stacking 6) or a reader-encoder 5. The tongs 3 are, then, fixed along the Y-axis, whereas the truck 4.1 moves along the X-axis. The second of these (Y-axis), which is perpendicular to the X-axis, corresponds to advancing (or withdrawal, respectively) of the tongs 3 toward a hopper (1,6,7) or a reader-encoder 5 (or from a hopper or reader-endcoder, respectively). The truck 1, then, remains fixed, whereas the tongs 3 are mobile along the Y-axis.

Movements along the X-axis are controlled by a motor M20, preferably one of the DC-current type. The device involves two guide tubes 4.2 and 4.3 which accommodate the truck 4.1. A belt 4.4 is stretched between a roller 4.5, mounted on the M22 motor shaft, and a return roller 4.6. The truck 4.1 is also fixed to this belt 4.4 and moves under the effect of the rotating belt 4.4, itself moved by the rotating motion of the M22-motor shaft.

Two SW 220 and SW 221 switches are provided at both ends, either side of the truck travel, to interrupt the M22-motor control in the event of overrun. These are wheeled-lever QS microswitches of the AN 3266 type. Truck travel is limited on one side by the position of truck 4.1 in front of the feed hopper 1 (initial position) and on the other side by the position in front of an output hopper, for example, in the mode of realization described, the stacking hopper 6 for the personalized cards.

A small scale 4.7, consisting of a number of holes corresponding to the various positions of the three hoppers (1,6,7) and the five reader encoders 5, is fixed parallelly to the guide tubes 4.2 and 4.3. These holes are detected by an optical-transmission type cell C221 located at the base of the tongs toward the truck. The cell, then, "sees" the various holes situated on the small scale 4.7 and releases a signal to the control logic for each hole detected, whenever this cell C221 is no longer hidden. The nth signal, corresponding to the nth hole detected, is interpreted as a stop signal by the control logic which, then, shuts off the motor M22, and the truck is then positioned in front of the desired station.

Since the travel speed of the truck is relatively fast (about 200 mm/sec.), the truck does not stop instantaneously, and exactness realized in the stopped position can, then, be just mediocre. Interpretation of the signals and motor shutoff occur almost instantaneously. The motor-M22 shaft has momentum, as well as the belt, which contributes just as much to poor positioning of the truck. For that reason, in a preferential mode of realizing the invention, two other cells C220 and C222, identical to C221, are put either side of cell C221. These also detect the scale holes and, at the nth hole searched out, they release a signal interpreted by the control logic as a signal to slow down.

Cell C220 intervenes in case of movement in the direction of the initial position (feed hopper 1), whereas C222 intervenes in the event of movement in a direction from the initial position. Cell C221 then transmits a full-stop signal. Thus, positioning accuracy is far better, approximately ±0.5 mm.

Movement along the Y-axis is controlled by a motor M21, preferably of the reduction type. The M21-motor shaft is connected by a belt to the return roller 4.8 which, aided by belt 4.9 and a worm, causes linear motion of the tongs 3. Linear-motion speed of the tongs 3 along the Y-axis should be selected somewhere between 50 and 100 mm/sec. in order to allow the magnetic reader 5 to be able to correctly read the data coded on the magnetic track. As a matter of fact, reading of such data necessitates running this track above a reading head. In the way this invention is realized that speed was chosen as approximately 60 mm/sec.

Just as in the case of movement along the X-axis, two wheeled-lever, travel-stop switches SW210 and SW211 are provided at both ends of the tong travel in order to interrupt the M21-motor control in the event of overrun. The switches correspond, respectively, to the withdrawal position of the tongs 3 and their forward position. That way positioning accuracy is about 1 mm.

In FIG. 5a the position of the tongs is represented in a withdrawal position. As previously indicated, safety switch SW 210 makes it possible to interrupt motor control in the event of an overrun in the withdrawal position. Another sensor C210, cantilevered with respect to the truck and mounted on it, is provided for instructing the control logic on "the tongs withdrawn" position. This cell C210 is hidden by a flag mounted on the tongs whenever they are in the withdrawn position. The control logic is then instructed on the step taken and can execute the following one. As a rule, that one will be movement along the X-axis to seek out a specific station.

Figure 6:
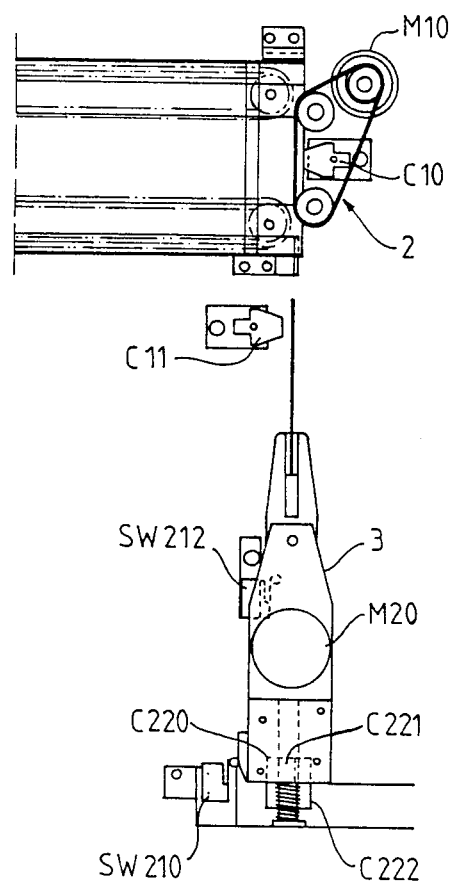
FIG. 6 is a diagram of the tongs in the forward position in front of the feed hopper.
Figure 7:
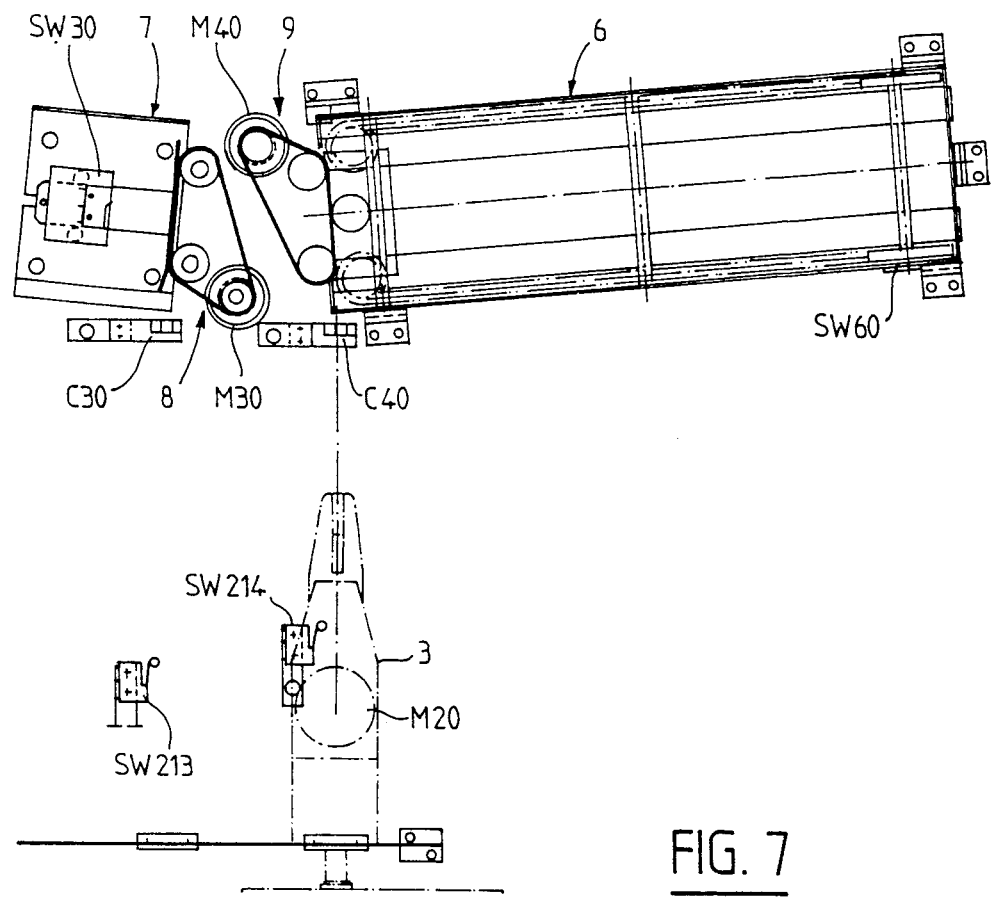
FIG. 7 is a diagram of the stacking and scrapping hoppers and also of the tongs in the forward position in front of the stacking hopper.
Figure 8:
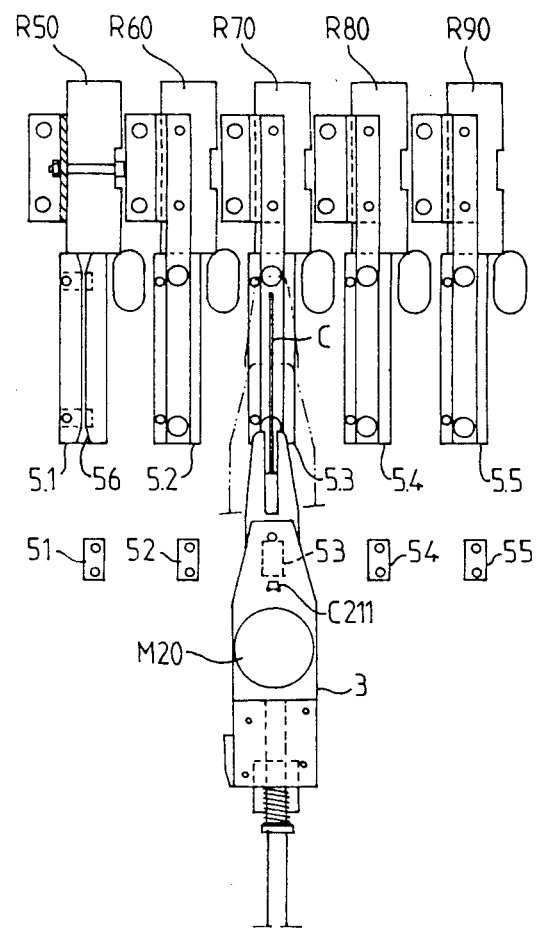
FIG. 8 is a detailed diagram of the reader-encoders and the tongs in the forward position in front of the reader-on-coders.

Reference is now made to FIGS. 6, 7, and 8 which illustrate various operational modes for the tongs. In FIG. 6 the tongs 3 are represented in the forward position in front of the feed hopper 1. In this instance, the tongs are ready to extract a card. A Switch SW212 is placed at the input of each hopper to interrupt the M21-motor control. In case of an extracting operation, and also in the event of a card-storing operation, it is not actually necessary that the tongs move to the very limit of their normal travel. The fact is, the hoppers are placed slightly ahead with respect to the reader-encoders, for one thing: the cards are, for another thing, taken into account by the separating devices (or those for storing), which does not require such advancing of the tongs, so the SW 212 switch takes care of that task.

In FIG. 7 the tongs are represented in the forward position in front of the valid-card stacking hopper 6. Just as for the feed hopper 1, SW214 switch of the wheeled-lever microswitch type, interrupts the M21-motor control for advancement of the tongs in order that they position themselves correctly in front of the storing device 9. The same thing is true of the scrapping hopper 7 which is provided with an SW213 microswitch.

The output hoppers are also represented in this figure. In question are the scrapping hopper 7 for defective cards and the stacking hopper 6 for personalized cards, as well as their associated storing devices 9 and 8. The stacking hopper 6 is, as a matter of fact, identical to the feed hopper 1 previously described in FIG. 4. Accordingly, in question there is a removable cassette of standard dimensions: 90×90×300 mm, capable of containing about 200 embossed cards.

However, no sensor has been provided for an empty stacking hopper, though this situation should not involve any consequence in the process of operations. No switch (or sensor) has been provided, either, for the full stacking hopper. The stacking cassette 6 should, in fact, be removed and replaced by an empty cassette whenever an input cassette is changed. Although it is not indispensable, one can provide for an SW60 switch to interrupt the robot during replacement of one stacking cassette (at least). Associated with it is a storing device 9, identical to the separating device in FIG. 4. Instead of extracting the cards, this device piles them vertically in the stacking hopper 6. A sensor C40 controls the motor M40 of the storing device 9 so long as the card is present in front of the sensor C40. Contrary to sensor C11 in FIG. 4, sensor C40 is put on the outside edge of stacking hopper 6 so that, whenever sensor C40 fails to "see" the card any longer, then it is already correctly filed in the hopper 6. A short reaction time can be planned so the M30 motor is shut off only when the card to be filed is correctly input in the stacking hopper 6.

The scrapping hopper 7, suited to containing the defective cards, is identical in nature to the other two hoppers 1 and 6 already described but it is of smaller dimensions and typically 75×90×90 mm because it is not expected to hold a great number of cards, on an average 30 cards at the most. The scrapping hopper 7 is also provided with an SW30 switch put at the base of the hopper 7, to indicate a full scrapping-hopper status. Associated with it is a storing device identical to those previously described. For reasons of convenience, the motor M30, however, is found inside the robot, and a sensor C30 controls this motor M30.

Hoppers 6 and 7 are slightly inclined in opposite directions along the hopper and reader-encoder axis. Such a slant actually favors better grasping of the card for the storing devices 8, 9, as well as more-convenient inputting into hoppers 6 and 7. In FIG. 8 the tongs 3 are in the forward position in front of one of the reader-encoders. In this case, since the tongs move at a uniform speed, they have traveled to the end of their path on inputting the bank card C in the reader-encoder 5.3. Thus, the latter can read the data coded on the magnetic track. In order for the control logic L to be instructed on the forward position of the tongs 3 in front of one of the reader-encoders, and then order interruption of the motor M21 once the tongs 3 have reached the desired position, it is provided with a sensor C211 which is put below the tongs 3. The cell C211, of the transmission-sensor type, is concealed by a flag 53 put opposite the corresponding reader-coder. The overrun switch SW 211, already referred to, insures a shut-off of the motor M21 in the event of malfunctioning of cell C211.

Represented in the same figure are reader-encoders 5.1 and 5.5. In the preferred way to realize the invention, the bank cards are actually composite cards involving a magnetic track and a microcircuit at the same time. Consequently, the reader-encoders must be capable of reading the information provided by the magnetic track, transmitting it to the control-unit U discs, where all the other dependent information is put into memory, and encoding it on the microcircuit.

Considering the current practical and economical data, the number of reader-encoders has been limited to 5, and these reader-encoders are arranged one behind the other and spaced 45 mm apart. The combination reader-encoder 5, then, comprises a regular manual reader for reading the IS02 track. Moreover, at the back, in its extension, there is a card-to-memory connector of the Bull CP8 type, for example.

The card grasped by the tongs is, then, first input into the magnetic reader at a speed of 60 mm/sec. When the card gets to the rear of the combination reader, it has been read by the magnetic reader and is then in the correct position for the personalizing operation. Then it is released by the tongs which withdraw. The correct position for the card in a combination reader-encoder is indicated by a contact (R50, R60, . . . R90) located at the back of the combination reader-encoder. This is the signal which, for one thing, causes the tongs 3 to let go and induces them to withdraw; for another thing, it triggers the personalizing operation.

In order to absorb faulty positioning at the reader-encoders, the latter are provided, at their input, with a flared-lip guiding device (for example, 56 for 5.1). Any other device suited to conducting the cards suitably inside of the combination reader-encoders can be used. A guiding device is also put above the magnetic reader so that inserting the card inside the reader is done correctly. The card C is forwarded to the base of the reader-encoder by the tongs 3, themselves. One can also provide for small carrier rollers to insert the card and extract it, thus allowing the tongs 3 to remain positioned opposite the reader-encoder.

In one mode of (the) realization the control unit U, which governs the personalizing operations, is a microcomputer of the IBM-PC compatible type with 256 kilobytes of RAM and involving two 5¼-inch diskette readers. This transmits a signal to the robot command logic L indicating a personalizing operation, so long as that operation is in progress. At the end of each operation, the microcomputer transmits an ending signal to the control logic L, which stores it. The ending signals are labeled MCR50, . . . , 90.

Figure 9:
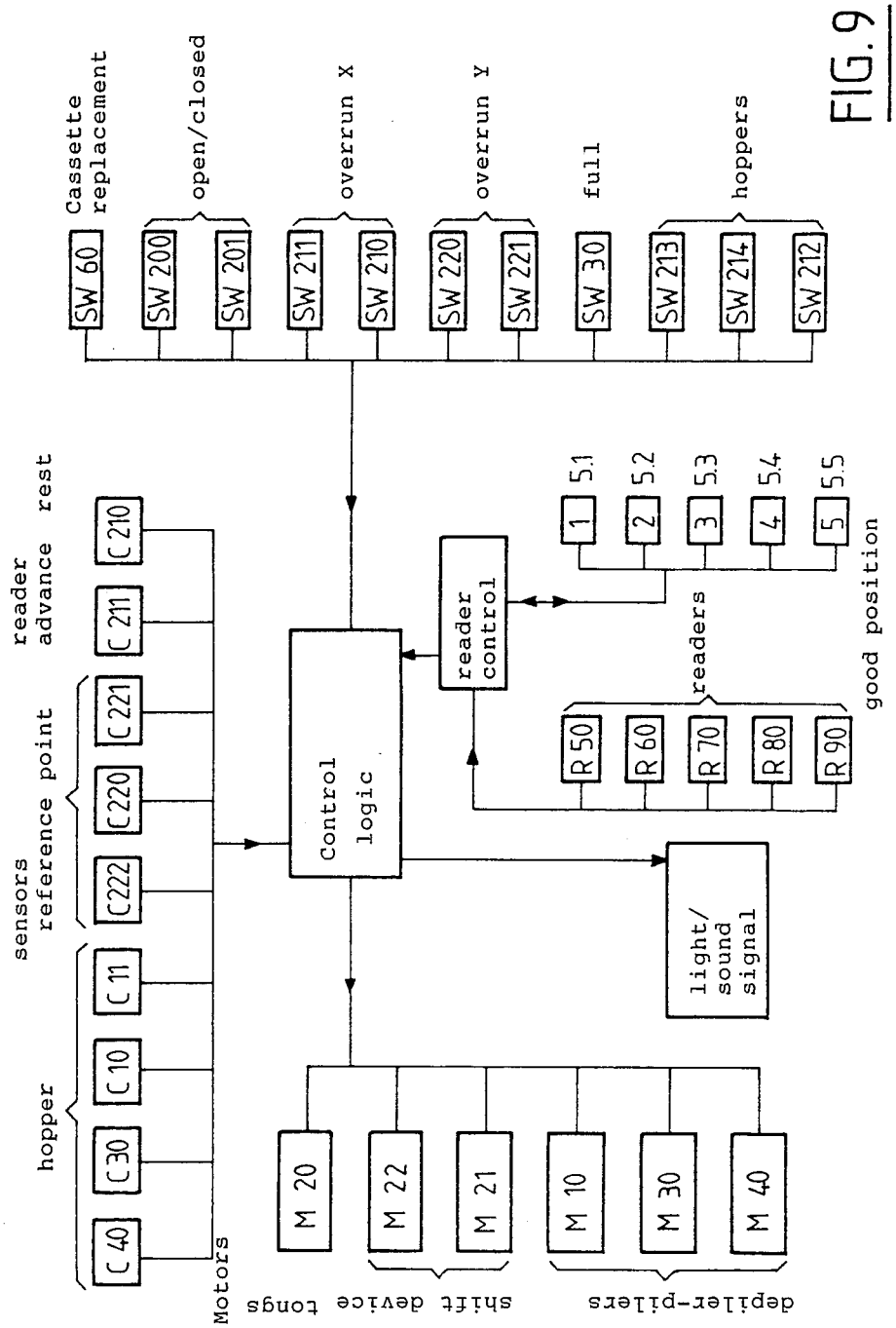
FIG. 9 is a basic diagram to demonstrate the various electronic connections, between the sensors, the motors and the switches, with the control logic.

FIG. 9 illustrates by diagram how the various components of the apparatus are linked to the robot control logic which governs all its operations, as well as its relationship to the reader-encoder control U. The inputs and outputs can be distinguished in a very general way. The inputs are the signals transmitted by the various sensors and switches, besides the signals given out by the reader-encoder control U. On this diagram we can see that the personalizing operations, themselves, are independent of the control logic L but are governed by the reader-encoder control U.

Sensor C10 transmits a full-hopper signal to the logic L. Jointly with the sensor C11, it allows for displaying the "empty feeding-hopper" signal and it causes shut-off of the motor M10. These sensors C11, C30 and C40 govern extraction or loading of a card. They act on motors M10, M30 and M40, respectively, and can trigger a "faulty separation" or "storing fault" signal. Besides that, they actuate motor M20 (opening or closing of the tongs 3).

Switch SW30 allows displaying of the "full scrapping-hopper" signal and can cause one or several motors to be shut off, even all of them (stopping the robot for fear of damaging the cards). As for switch SW60, it indicates that a stacking-cassette replacement is in progress which, in a preferential mode of realizing the invention, cuts off all the motors.

Sensors C220, C221 and C222 make it possible to position the truck 4.1, and they act on the motor M22. Sensors C211 and C210 instruct the logic L as to the position of the tongs 3 along the Y-axis, which makes it possible to effect the following step (actuating of the motor M20 in the case of sensor C211, and actuation of the motor M22 in the case of sensor C210.

The switches SW200 and SW201 are the ones that actuate opening and closing of the tongs 3 (action on motor M20). As for switches SW 210 and SW 211, SW 220 and SW221, they all act on motors M21, M22, respectively, in the event of motion overrun. Finally, contacts R50, . . . , R90 (reed relay contacts) act on the reader-encoder control U, because they initiate the personalizing operation. The microcomputer U, which controls the reader-encoders 5, sends a "operation in progress" or "end of operation" signal to the control logic L, which stores it. These various functions, peculiar to each sensor or each switch, are summarized in the chart shown in FIGS. 10a and 10b.

This chart shows four columns that indicate, for each operation station (that is, each sub-assembly relating to an operation), the motor actuated, as well as the sensors or switches controlling the motor. The last column, then, translates the particular action in terms of functions. Considering, for example, the logical development of the complete personalizing operation, the motor M10 is controlled by these sensors C10 and C11, C10 indicating an empty feed hopper, whereas C11, if it is triggered, does not send any signal to M20 to have the tongs open up. Of course, the motor M20 controls the tongs, and the switches SW201 and SW200 determine the status of the tongs (tongs opened or closed). The rest of the chart, then, accounts for the previously-described FIG. 9 in another form.

Figure 11:
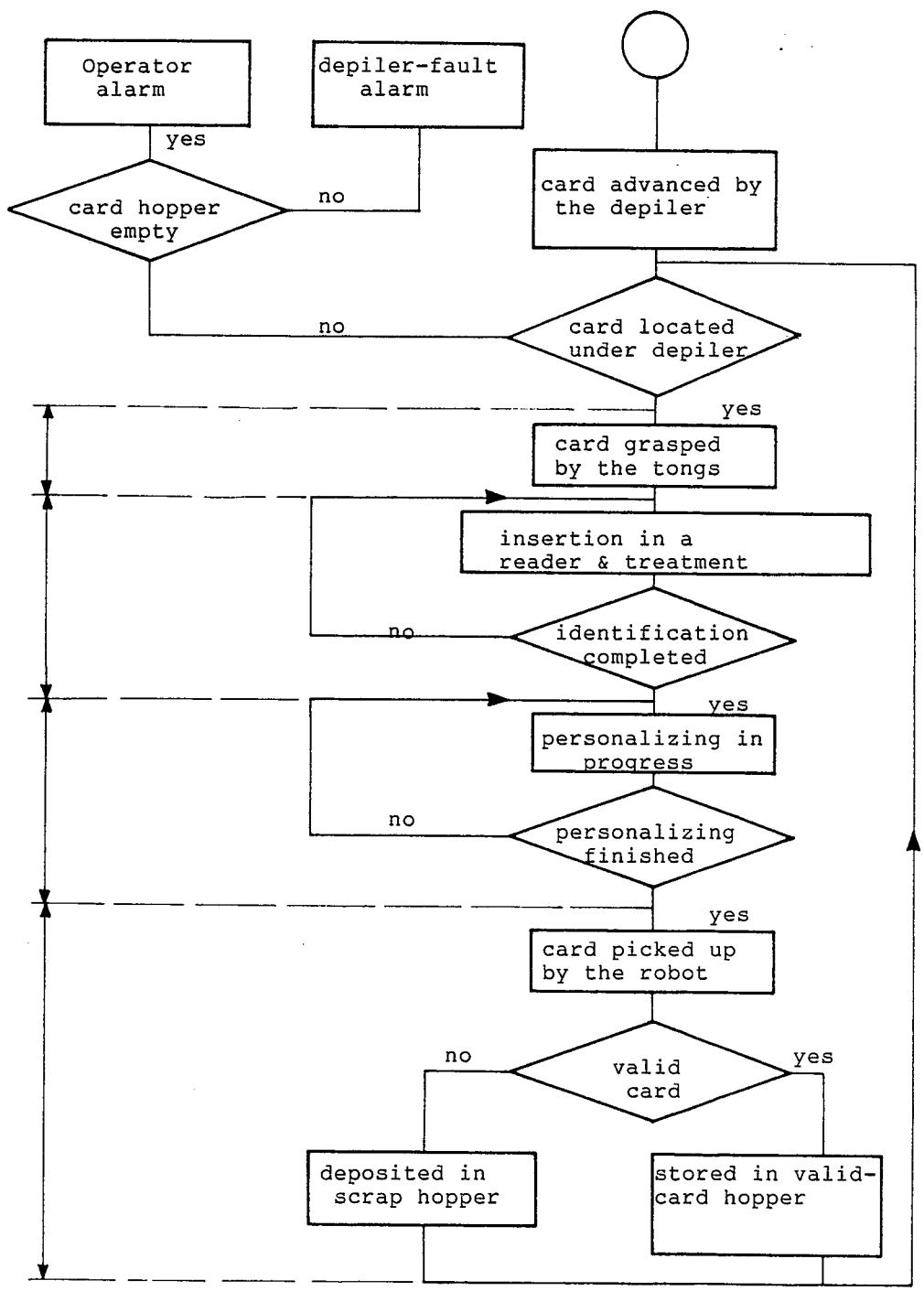
FIG. 11 is a diagram of the personalizing operation for a card.

FIG. 11 pictures a sequential diagram of the personalizing operations relating to any one card. The card to be personalized must first be advanced by the depiler, and then two situations present themselves:

the card is not there, which implies either that the feed hopper 1 is empty, or else that there is something wrong with the card-separating system 2. In either instance, an alarm signal is given out;

the card is present but under the depiler 2.

In this latter case, the card is grasped by the tongs 3 and transferred to the reader-encoder 5. This operation takes 2.5 sec. on the average. The card is then input into the reader-encoder 5 to be read by the magnetic reader, an operation which lasts 1.5 sec. Once identification by help from the magnetic track is completed, it is personalized. Personalizing time for the microcircuits is, with the present state of the art; approximately 30-to-40 sec. for the bank application contemplated.

At the close of the personalizing operation the card is picked up by the tongs 3 and transferred, depending on whether or not it is defective, to one of the output hoppers 6 or 7. This is an operation that takes about 3 sec. Accordingly, the complete operation from the card's initial position in the feed hopper 1 to its final position in one of the output hoppers 6 or 7, runs 9.5 sec on the average, except for the personalizing operation. Hence, it is possible to manage 4 to 5 combination reader-encoders 5 with the same robot when personalizing time runs between 30 and 40 seconds. It would be possible, of course to manage more reader-encoders; however, the costs incurred do not justify that because the time-wise distribution is optimal for 4 or 5 reader-encoders. Beyond that the degree of optimization decreases.

Figure 12:
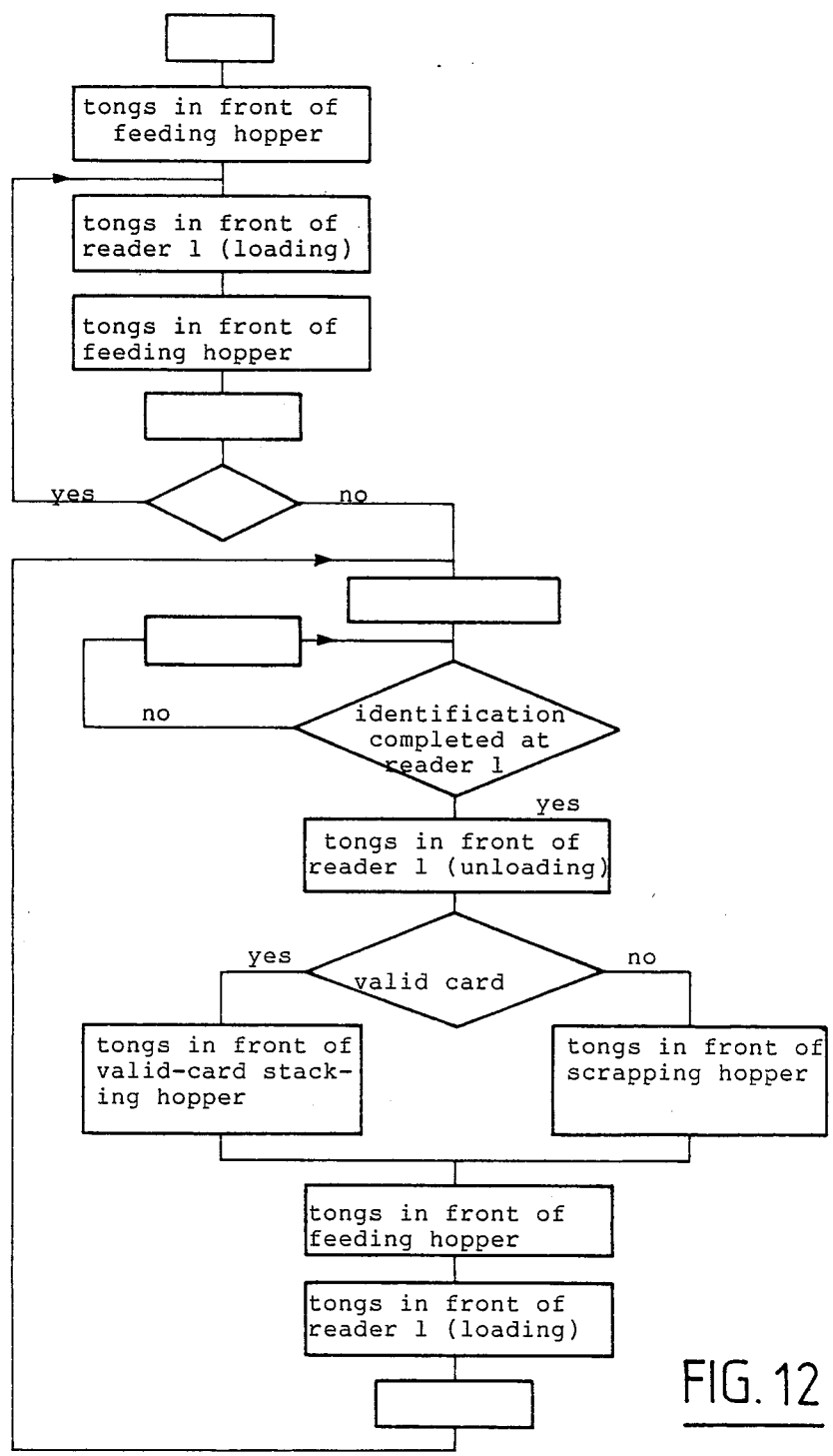
FIG. 12 is a diagram to show management of the personalizing operations for all the reader-encoders.

In FIG. 12 we find the diagram for management of personalizing operations for all the reader-encoders. The diagram takes these for its hypotheses:

with an established system, card unloading is followed immediately by loading of a new card;

if the personalizing operation for any one reader-encoder is not finished, the immediately-following reader-encoder is taken into consideration;

the personalizing operations with the different reader-encoders are conducted sequentially (reader-encoder 5.1 to 5.5, then resuming with the reader-encoder 5.1);

the cards in the stacking hopper 6 for valid cards must be arranged in the same order as in the feed hopper 1.

These hypotheses permit establishing a simple, effective algorithm, and other hypotheses can be considered without modifying the scope of this invention. For example, one could arrange that, if the personalizing operation for any one reader-encoder A is not finished, the robot would go to the following one B and then return to A to make sure that the operation was finished. Next, it would pass to reader-encoder C, the next one after reader-encoder B.

The rectangles in FIG. 12 indicate the position of the tongs 3. The opening/closing and displacement operations of the tongs are understood. Accordingly, the tongs are first in the initial position in front of the feed hopper 1, and within 4 seconds have inserted the card in the reader-encoder 5.1. The tongs, then, come back to the feed hopper and load another card into the reader-encoder 5.2, and so on until the tongs have loaded the reader 5.5. By that time 45 sec. have passed. Then the tongs can be programmed to wait several seconds so that 30 seconds will have elapsed, corresponding to card-personalizing time for the reader-encoder 5.1.

The control logic L then checks to see whether the personalizing operation is complete. If so, it checks on whether the card is valid, and both these items of information, on completed personalizing and validity, are sent jointly by the reader-control U to the control L at the end of each personalizing operation. Depending on validity of the card, the tongs, which have moved toward the reader-encoder 5.1, unload the card in one of the designated hoppers. Then the tongs return immediately to the feed-hopper 1 and load the reader-encoder 5.1 which was empty. Then they go on to the reader-encoder 5.2 and proceed as previously described.

In case any personalizing operation is not concluded, the tongs, programmed by the control logic L, mark time and wait for the reader-encoder operation in question to be completed. Accordingly, the robot proceeds to the 5th reader-encoder and starts the cycle all over again with the first reader-encoder. If the personalizing times are known and constant, a precise adjustment of the sequence makes it possible to avoid the "personalizing operation not completed", so the tongs do not have to be left idle for several seconds.

Right during the first 5 steps of the FIG.-12 algorithm (the reader-encoder loading phase) a test can be employed to determine whether the first reader-encoder loaded has already finished the personalizing operation. If so, initial loading of the reader-encoders is interrupted and cannot involve more than 3 or 4 of the reader-encoders, instead of the 5 readers first planned. The rest of the algorithm remains unchanged and is continued with just those reader-encoders.

Naturally, this invention is not limited to the modes of realization described here. Even though it is advantageous to use only 4 or 5 reader-encoders, a greater number of them can be utilized, depending on the state-of-the-art solution.

As already indicated, personalizing of the cards can be done subsequent to optical reading of the characters stamped on the card, for example, with the help an OCR reader. Such readers can be put at each personalizing unit, or a single unit is used in a common capacity at the output of the feed hopper. More generally, the data to be personalized can be acquired by any other device reading data on the card, for example, by a micro-perforation inscription laser.

Nor is this invention limited to the means contemplated for storing, separating, ranking or transporting the cards. Such means may, as a matter of fact, be conceived quite differently, though still keeping the functions explained above. The same thing applies to the hypotheses determining the robot-optimization algorithm. Other restraints can be contemplated which would, then, appreciably modify the programming algorithm.

On the basis of another variant, the basic information is received by remote loading, and all the card-personalizing operations are effected inside the apparatus; namely: embossing, magnetic encoding and loading of the microcircuit. Moreover, certain cards do not have the microcircuit in a corner; rather, close to the middle of one of the wide portions of the card. Of course, one would be able to adapt, accordingly, the reader-encoders, as well as the way the tongs grip a card. Finally, other sensors or switches may prove necessary, or even indispensable, to ensure better functioning of the robot and greater safety. Remote loading of the robot program is also conceivable and without modifying the scope of the invention described above.

What is claimed is:

1. Card-personalizing apparatus comprising:
   at least one card-treating device; and
   a handling robot, the card-treating device includes several personalized units associated with a control unit suited to management of personalizing operations, and
   the robot includes at least
   a feeding hopper for accommodating the cards to be personalized,
   a stacking hopper suitable for lodging the personalized cards,
   a scrapping hopper for holding incorrectly personalized cards or defective cards,
   two-way shift device for movement along an initial axis,
   a gripping means for gripping the cards, said gripping means mounted on said two-way shift device, said gripping means moving along a second axis perpendicular to said initial axis, said gripping means
   for extracting a card from the feeding hopper and for transferring said card to a personalizing unit,
   for inserting said card in said personalizing unit,
   for recovering said card from said personalizing unit,
   for transferring said card to the stacking hopper, or to the scrapping hopper if the card is defective, and
   for unloading the card in the stacking hopper, or in the scrapping hopper if the card is defective, and
   a control logic, connected to the control unit to manage the personalizing operations and for actuating said gripping means and the two-way shift device in such a way as to insert, during one personalizing operation in one of the personalizing units, one or more operations of extraction, transfer or unloading of the card with respect to one or several personalizing units available.

2. Card-personalizing apparatus according to claim 2 wherein the robot also comprises:
   a card separating device, associated with the feeding hopper for partially extracting the card from said hopper;

card-storing devices, linked to the stacking hopper and scrapping hopper, respectively, which are suitable for storing the card in one of said hoppers.

3. Card-personalizing apparatus according to claims 1 or 2, wherein the cards are ones which include at least a coded magnetic track and an uncoded microcircuit, where the personalizing operation consists of coding the microcircuit from data on the card and/or from information stored in the control unit.

4. Card-personalizing apparatus according to claim 3 wherein the personalizing units are combination reader-encoders of magnetic-track, microcircuit cards which include a memory-card connector.

5. Card-personalizing apparatus according to claims 1 or 2, wherein the feeding hopper and stacking hopper are interchangeable, removable cassettes.

6. Card-personalizing apparatus according to claims 1 or 2, further comprising at least one sensor which ties in with the feeding hopper in order to detect whether the feeding hopper is empty.

7. Card-personalizing apparatus according to claims 1 or 2 further comprising at least one status switch which connects with the scrapping hopper to determine whether the scrapping hopper is full.

8. Card-personalizing apparatus according to claim 2 and wherein the card-separating, stacking hopper or scrapping hopper include at least one motor, and preferably one of a reduction type, plus a rubber belt with a silicone coating.

9. Card-personalizing apparatus according to claim 2, wherein the card separating device comprises at least one sensor for detecting whether the card is output from the feeding hopper, and a separating-device motor control is maintained so long as the card in question is not detected by said sensor.

10. Card-personalizing apparatus according to claim 9 wherein said sensor transmits to the control logic a separation-fault signal whenever the card to be extracted is not spotted by the sensor after a normal time planned for the extraction operation, the signal can also be interpreted by the control logic as an empty feeding-hopper signal if the control logic simultaneously receives a signal from a sensor associated with the feeding hopper.

11. Card-personalizing apparatus according to claim 8 wherein each of said stacking hopper and said scrapping hopper has at least one sensor in order to check on whether the card is at an input of the stacking hopper or the scrapping hopper, respectively, and control of the motor for each of the stacking hopper and the scrapping hopper is maintained so long as the card is detected by said sensor.

12. Card-personalizing apparatus according to claim 1 or 2 wherein the gripping means for gripping the cards uses tongs which are preferably controlled by a reduction-type motor associated with an eccentric.

13. Card-personalizing apparatus according to claim 12 wherein at least two status switches controlling open and closed tong positions are connected to said tongs.

14. Card-personalizing apparatus according to claim 12 wherein the tongs have two options, to absorb positioning errors at the personalization units, made possible by a spring and flexible washers which are a part of the tong.

15. Card-personalizing apparatus according to claims 1 or 2 further comprising a first motor of a DC type, to permit movement of the gripping means along the initial axis that corresponds to stop positions for said gripping means in front of one of said hoppers or the personalizing unit, a second motor of a reduction type, to permit movement of the gripping means along the second axis which corresponds to transfer of the card between said gripping means and a personalizing unit or one of said hoppers.

16. Card-personalizing apparatus according to claim 15 particular about it: the two-way shift device, provided with at least one cell to locate the personalizing unit or the selected hopper along the initial axis of movement.

17. Card-personalizing apparatus according to claim 16 wherein at least two other cells are positioned on either side of said at least one cell and are linked to said at least one cell, which permit slowing down the two-way shift device as the two-way shift device approaches the personalizing unit or the selected hopper along the initial axis of movement.

18. Card-personalizing apparatus according to claim 15 wherein the two-way shift device has at least two safety switches, for detecting any over-run along the initial axis, said safety switches being provided along the initial axis at initial and final positions, respectively.

19. Card-personalizing apparatus according to claim 15 wherein the two-way shift device has at least two safety switches, for detecting a travel stop along the second axis, said safety switches being provided along said second axis at the gripping means withdrawn and extended positions, respectively.

20. Card-personalizing apparatus according to claim 15 wherein associated with the two-way shift device is at least one sensor for detecting a withdrawn position of the gripping means along the second axis; whereas, the gripping means are provided with another sensor which, concealed by a flag found at an input of each personalizing unit, indicates a forward position of the gripping means in front of the personalizing unit (5).

21. Card-personalizing apparatus according to claim 15 wherein connected to the two-way shift device is at least one switch, located at an input of each of said hopper, to permit positioning the gripping means in front of the corresponding hoppers.

22. Card-personalizing apparatus according to claims 1 or 2 wherein each of the personalizing units has a guiding assembly proper for allowing correct insertion of the card in said personalizing unit and compensating for deviations in positioning.

23. Card-personalizing apparatus according to claim 1 or 2 wherein each personalizing unit includes a contact, indicating insertion and correct positioning of the card in said personalizing unit and transmitting a signal to the control unit for the personalizing units to initiate the personalizing operation.

24. Card-personalizing apparatus according to claims 1 or 2 wherein the control unit of the personalizing units sends a series of signals to the control logic indicating
availability status of the personalizing units,
completion status of the personalizing operation in progress in each personalizing units which are operative,
end-of-personalizing-operation status of the card being treated in the personalizing unit, and
result of the personalizing operation for said card.

* * * * *